D. C. LARSON.
STOP MOTION APPARATUS.
APPLICATION FILED SEPT. 16, 1916.
1,311,655.
Patented July 29, 1919.
2 SHEETS—SHEET 1.
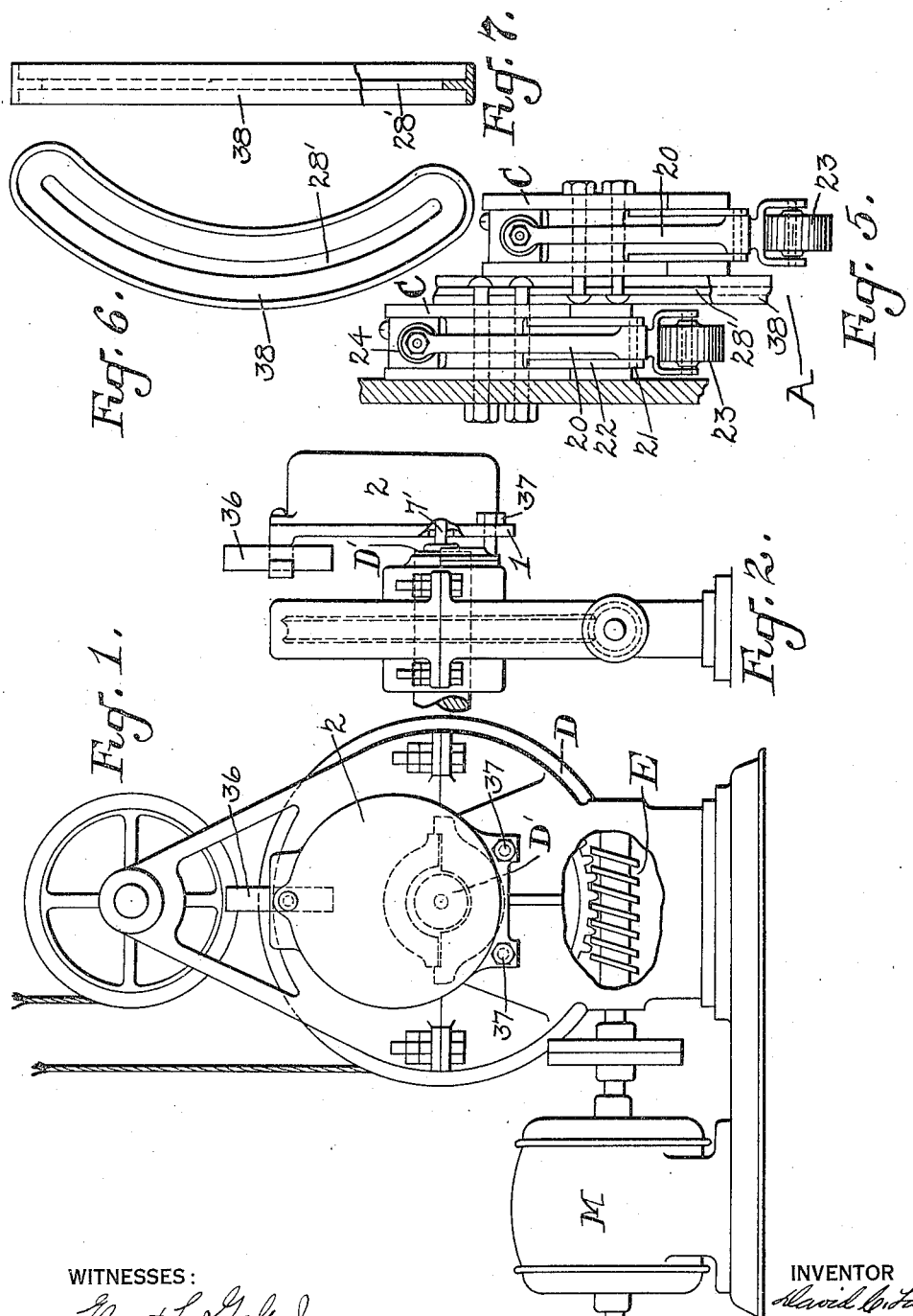
WITNESSES:
Ernest L. Gale Jr.
James G. Bethell.
INVENTOR
David C. Larson
BY L. A. Campbell.
ATTORNEY

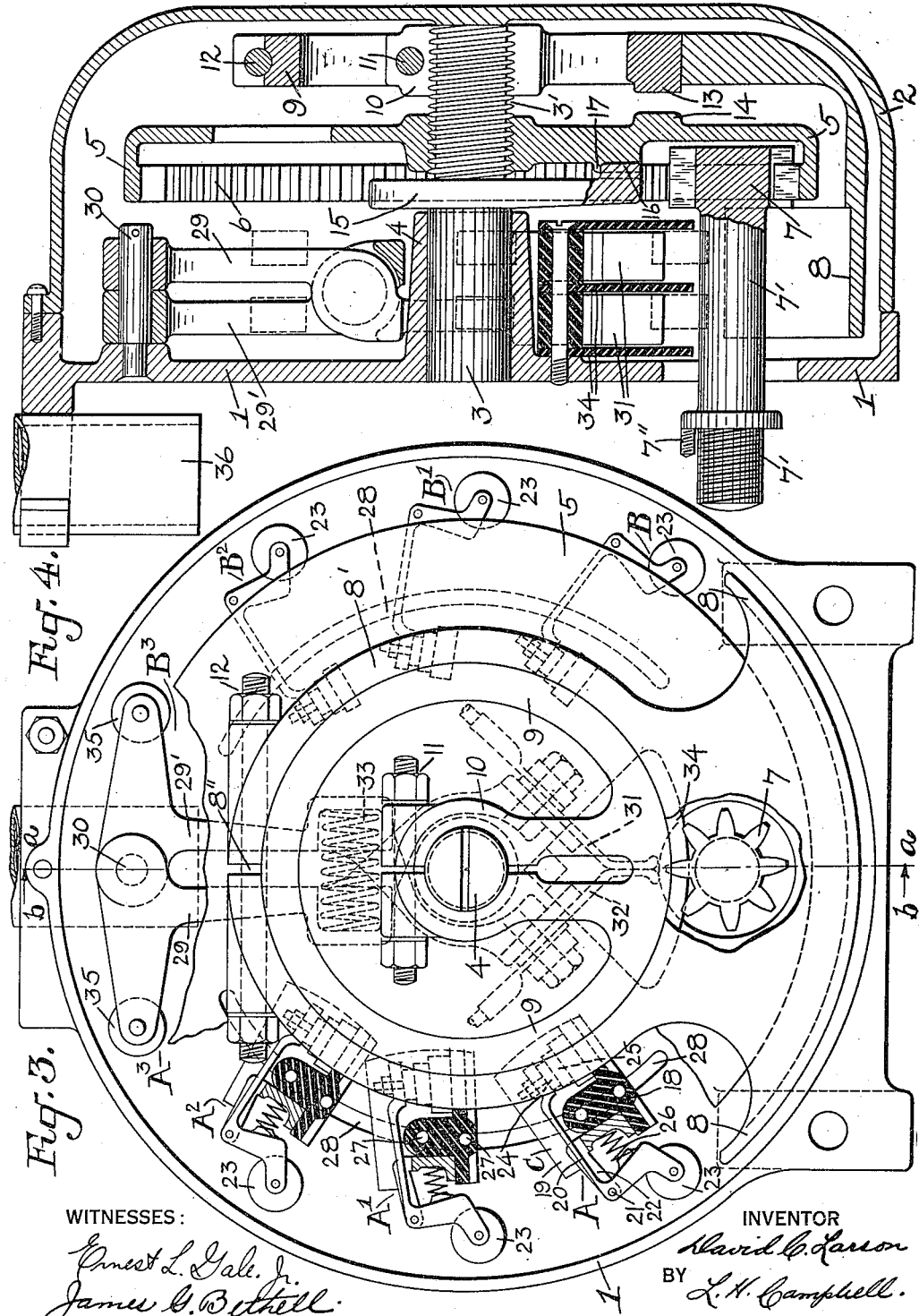

UNITED STATES PATENT OFFICE.

DAVID C. LARSON, OF YONKERS, NEW YORK, ASSIGNOR TO OTIS ELEVATOR COMPANY, OF JERSEY CITY, NEW JERSEY, A CORPORATION OF NEW JERSEY.

STOP-MOTION APPARATUS.

1,311,655.  Specification of Letters Patent.  Patented July 29, 1919.

Application filed September 16, 1916. Serial No. 120,437.

*To all whom it may concern:*

Be it known that I, DAVID C. LARSON, a citizen of the United States residing in Yonkers, in the county of Westchester and State of New York, have invented a new and useful Improvement in Stop-Motion Apparatus of which the following is a specification.

My invention relates to automatic stop motion devices for use in connection with electric elevators, and has for its object to provide a device of the character above noted, involving improved features of construction and arrangement of parts having the mode of operation substantially as hereinafter set forth.

In the accompanying drawings, Figures 1 and 2 illustrate side and front views respectively of an electric elevator system sufficient to illustrate the application thereto of the stop motion device; Fig. 3 illustrates a somewhat enlarged front detail view of the stop motion device, with a front cover plate removed, and with certain other parts in sections; Fig. 4 illustrates, in section, a view of Fig. 3 taken substantially on the line *a—a* as viewed in the direction of arrows *b—b*; Fig. 5 illustrates a manner of mounting the switch mechanism, and Figs. 6 and 7 illustrate different views of a member used in mounting the switches.

The stop motion device in detail consists of a base 1 provided with a removable front or cover plate 2. A stop motion shaft 3 is supported by a hub 4 which may form an integral part of the base 1. The shaft 3 is provided with a screw thread portion 3' on which is mounted what I will term herein a traveling nut 5. The traveling nut 5 is provided on its periphery with gear teeth 6 adapted for engagement by a pinion 7. The teeth of the pinion 7 are constructed of sufficient length to allow for movement of the nut axially.

A switch actuating segmental drum 8 is rigidly connected to the stop motion shaft 3, through the intermediary of a cylindrical member or hub 9 having a split collar 10, which is clamped by a stud and nut connection 11 to the screw threaded portion of the shaft 3. The cylindrical portion 8' of the drum 8, is split at 8'', and clamped by a stud and nut connection 12 to the hub. The hub 9 is provided with a projecting tooth 13 which is adapted for engagement by a projecting tooth 14 formed on the traveling nut 5. An arm 15 rigid with the shaft 3, is provided with a projecting tooth 16 which is adapted for engagement by a projecting tooth 17 formed on the traveling nut.

The drum 8, as illustrated in Fig. 3, is in a normal or central position, it being adapted when rotated or rocked in a clockwise direction to actuate a double-row series of electrical switches A, A', A² and A³, and when rotated or rocked in an anti-clockwise direction to actuate a double-row series of electrical switches B, B', B² and B³. The switches such as A, A' and B, B' are similar in construction, each comprising an insulating member C comprising a central body portion 18 and end pieces 19. A switch arm 20 in the form of a bell crank is pivotally supported at 21 by a member 22 secured to the insulation. A roller 23 composed of insulation material such as hard rubber, is carried by the arm 20. The switch arm carries a contact 24 which is normally held in engagement with a stationary contact 25 by the action of a spring 26. The contact 24 is separated from the contact 25 by the engagement of the roller 23 with the drum 8. Each series of switches comprises a double row, there being interposed between the rows, a segmental shaped member such as 38. The bottom row of switches (see Fig. 5) together with the member 38 are bolted to the base 1, and the top row of switches are bolted to the member 38, bolt holes 27 in the insulating member being provided for this purpose. Slots 28 and 28' formed in the base 1 and member 38, respectively, are engaged by the bolts, these slots permitting proper adjustment of the switches. It will be noted that with this manner of mounting the switches, the two rows of each series can be adjusted independently of each other.

The switches A³ and B³ comprise a pair of contact carrying arms 29, 29', carried on a common pintle 30, carried by the base 1. The arms 29, 29' each carry a pair of metallic contacts such as 31 and 32, respectively, the two pairs of contacts, being held in electrical engagement by the action of a coil spring 33 interposed between the switch arms. Each pair of contacts are suitably insulated from their respective switch arms, and additional insulating members 34 in the form of arc deflectors are secured to the base 1.

Each arm 29 and 29' carries a roller 35, adapted for engagement by the drum 8, the engagement of either roller by the drum effecting the separation of the contacts carried by the arms.

The two pairs of contacts 29 and 29' are adapted to be connected in the main line circuit of the motor which operates the elevator car, while the remaining switches are connected in the various controlling circuits of the elevator system as disclosed for example in the patents of J. D. Ihlder, No. 560,217, and G. John and D. Lindquist, No. 1,159,587.

Wires connected to the various switch devices which comprise the stop motion device, pass through a suitable opening in the base, and through a conduit 36 which is clamped to the base 1.

The application of the present stop motion device to one well known type of elevator apparatus is illustrated in Figs. 1 and 2, in which an electric motor M is connected to a winding drum D through a well known worm and gear connection E. A drive shaft is designated D', this shaft at one end, receiving the screw threaded portion of the pinion shaft 7'; a suitable lock stud 7'' being provided. The stop motion device is secured to the machine by the bolts 37.

The operation of the stop motion device in conjunction with the elevator hoisting mechanism will now be described.

The traveling nut 5 as will be particularly noted, is permanently connected to the drum shaft D', through the intermediary of the pinion 7, and is thus rotatable at all times with the said shaft. Thus, rotation of the drum shaft in a clockwise direction, as viewed from the right hand of Fig. 4, causes rotation of the traveling nut 5, in a like direction; this rotation of the nut also causing movement of the latter axially in a left hand direction on the threaded shaft 4 which remains stationary until the tooth 17 on the nut engages the tooth 16 on the arm 15. This clutching action between the nut 5 and arm 15 now causes the shaft 3 together with the segmental drum, to rotate with the nut 5, the drum in this instance being rotated in a clockwise direction. The drum rotating in this direction, actuates or opens the series of switches, A, A', A² and A³, the latter switch disconnecting the motor M from its source of power supply.

Rotation of the drum shaft D at this time in an anti-clockwise direction, which corresponds to a reverse direction of car travel, effects a like rotation of the nut 5, which permits the segmental drum 8 to return to center or normal position as shown in Fig. 3 by the action of its own weight, thereby permitting the closing of the series of switches A, A' by the action of their associated springs. This rotation of the nut also causes a movement thereof axially in a right hand direction on the threaded shaft 4, which remains stationary after the centering of the drum 8, until the tooth 14 on the nut engages the tooth 13 associated with the drum 8. The clutching action between the nut and tooth 13 causes the shaft 3 together with the segmental drum to rotate in an anti-clockwise direction with the nut. The drum rotating in this direction actuates or opens the series of switches B, B', B² and B³.

Rotation of the drum shaft D at this time, in a clockwise direction permits the segmental drum 8 to return to normal position as heretofore described, and permits the closing of the series of switches B, B', etc., by the action of their associated springs.

It will be particularly noted that the arm 15 and intermediate ring 9 bearing the tooth 13, are adjustable independently of each other and also independently of the segmental drum 8, that is to say without rotating the drum from its center or vertical position. This adjustment permits of proper timing of the clutching action between the nut 5, the tooth 16 on the arm 15, and the drum tooth 13. In practice, the timing is such that the clutching action between the nut 5 and arm 15 is effected when the elevator car approaches one limit of its travel, and between the nut and tooth 13, as the car approaches the other limit of its travel.

Having thus described the invention, what I claim as new and desire to secure by Letters Patent of the United States is:—

1. In apparatus of the class described, the combination with a power unit having a reversible rotatable shaft, a stop motion device comprising a screw threaded shaft, a nut movable axially by the said screw threads, a connection to rotate the nut at all times with the first named shaft, and means to connect the threaded shaft for rotary movement in a clockwise or anti-clockwise direction with the nut.

2. In apparatus of the class described, the combination with a power unit comprising a rotatable shaft, an automatic stop motion device comprising a screw threaded shaft, a traveling nut engaging the screw threads, a connection to effect rotation of the nut at all times with the first named shaft, means to effect rotation of the threaded shaft in a clockwise or anti-clockwise direction with the nut, and means actuated by the said threaded shaft.

3. In apparatus of the class described, the combination with a power unit comprising a rotatable shaft, an automatic stop motion device comprising a screw threaded shaft, a traveling nut engaging the screw threads, a connection to effect rotation of the nut at all times with the first named shaft, means to effect rotation of the threaded shaft in a clockwise or anti-clockwise direction with the nut, and a segmental drum rotatable by the said shaft.

4. In a stop mechanism, the combination of a rotatable threaded shaft, a nut threaded thereon and free to turn axially thereon and also to move axially of the shaft, and having means adapting it to be turned by power, an arm, fast on the shaft to one side of the nut, to effect an engagement between the nut and the arm, and a stop-mechanism element proper, fast on the shaft to the other side of the nut, and means to effect an engagement between the said element and the nut.

5. In a stop mechanism, the combination of a rotatable threaded shaft, a nut threaded thereon, and capable of axial and longitudinal movement relative to the shaft, and having means adapting it to be turned by power, an arm, adapted to be adjustably secured fast on the shaft to one side of the nut, and means to effect an engagement between it and the nut, and stop-mechanism element proper, adapted to be adjustably secured fast on the shaft to the other side of the nut, and means to effect an engagement between the nut and the said element.

6. In a stop mechanism, the combination of a rotatable shaft, threaded on one portion of its length, a nut also threaded thereon, and capable of both axial and longitudinal movement on the shaft, and having means adapting it to be turned by power, an arm, adapted to be secured fast on the shaft to one side of the nut, and means to effect an engagement between the arm and the nut, and a stop-mechanism element proper, comprising a ring or hub, adapted to be adjustably secured fast on the shaft to one side of the nut and a segmental drum, adapted to be adjustably secured fast on the said hub, and means to effect an engagement between the drum and nut.

In testimony whereof I have signed my name to this specification in the presence of two subscribing witnesses.

DAVID C. LARSON.

Witnesses:
ERNEST L. GALE, Jr.,
JAMES G. BETHELL.

Copies of this patent may be obtained for five cents each, by addressing the "Commissioner of Patents, Washington, D. C."